US012606682B2

(12) United States Patent
Kawamata et al.

(10) Patent No.: US 12,606,682 B2
(45) Date of Patent: Apr. 21, 2026

(54) COMPOSITE MATERIAL PANEL STRUCTURAL BODY AND METHOD OF MANUFACTURING SAME

(71) Applicant: KAWASAKI JUKOGYO KABUSHIKI KAISHA, Kobe (JP)

(72) Inventors: Akio Kawamata, Kobe (JP); Yoichi Nakamura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 269 days.

(21) Appl. No.: 18/109,856

(22) Filed: Feb. 15, 2023

(65) Prior Publication Data

US 2023/0192978 A1      Jun. 22, 2023

Related U.S. Application Data

(63) Continuation of application No. PCT/JP2021/030385, filed on Aug. 19, 2021.

(30) Foreign Application Priority Data

Aug. 19, 2020      (JP) ................................. 2020-138648

(51) Int. Cl.
*C08J 5/24*          (2006.01)
*B32B 5/02*          (2006.01)
*B32B 37/10*        (2006.01)

(52) U.S. Cl.
CPC ................. *C08J 5/243* (2021.05); *B32B 5/02* (2013.01); *B32B 37/10* (2013.01); *B32B 2262/106* (2013.01); *C08J 2300/22* (2013.01); *C08J 2300/24* (2013.01)

(58) Field of Classification Search
CPC ....... B32B 5/02; B32B 2262/106; C08J 5/243
See application file for complete search history.

(56) References Cited

U.S. PATENT DOCUMENTS

| | | | |
|---|---|---|---|
| 8,591,685 B2 | 11/2013 | Anderson et al. | |
| 9,254,619 B2 * | 2/2016 | Rotter ................... | B29C 70/462 |
| 9,511,550 B2 | 12/2016 | Mine et al. | |
| 2010/0028616 A1 * | 2/2010 | Yamanouchi ............. | B32B 5/12 |
| | | | 264/319 |
| 2014/0216638 A1 | 8/2014 | Vetter et al. | |
| 2014/0360417 A1 * | 12/2014 | Thrash ................... | B29B 11/16 |
| | | | 493/405 |
| 2019/0337242 A1 | 11/2019 | Carlson et al. | |
| 2021/0229377 A1 | 7/2021 | Shimada et al. | |

FOREIGN PATENT DOCUMENTS

| | | |
|---|---|---|
| JP | 2014-151648 A | 8/2014 |
| WO | 2019/078242 A1 | 4/2019 |
| WO | 2020/071417 A1 | 4/2020 |

* cited by examiner

*Primary Examiner* — Zachary M Davis
(74) *Attorney, Agent, or Firm* — XSENSUS LLP

(57) ABSTRACT

The number of composite material layers laminated to realize a preset thickness of a substrate, for example, a web portion of a panel structural body is referred to as a reference lamination number. Doubler layers that are the composite material layers added to the reference lamination number are laminated in at least a rib base bottom portion of the substrate. Reinforced fibers that includes basic layers and the doubler layers reach a tip portion of the rib. Filler layers that are composite material layers located only at a portion corresponding to a filler region may be laminated in the rib base bottom portion in addition to the doubler layers.

13 Claims, 8 Drawing Sheets

COMPOSITE MATERIAL PANEL STRUCTURAL BODY AND METHOD OF MANUFACTURING SAME

CROSS-REFERENCE TO RELATED APPLICATIONS

This application is a bypass continuation of PCT Application No. PCT/JP2021/030385, filed Aug. 19, 2021, which claims priority to Japanese Patent Application No. 2020-138648, filed on Aug. 19, 2020, the entire disclosure of each are incorporated herein by reference.

BACKGROUND OF THE DISCLOSURE

1. Field of the Disclosure

The present disclosure relates to a composite material panel structural body manufactured by press-forming and a method of manufacturing the composite material panel structural body, and particularly to a composite material panel structural body reinforced by a rib standing with respect to a substrate and a method of manufacturing the composite material panel structural body.

2. Description of the Related Art

From the viewpoint of the manufacturing efficiency of mass production, a method of manufacturing composite material parts, which are not limited to aircraft parts, by press-forming has been considered. For example, there are fiber reinforced plastic formed article which are manufactured by the press-forming and includes a rib projecting from a plate-shaped portion.

SUMMARY

A composite material panel structural body according to the present disclosure is a composite material panel structural body that is a press-formed article including a composite material containing reinforced fibers and a matrix resin. The composite material panel structural body includes: a substrate; and a rib standing with respect to the substrate. Basic layers that are composite material layers are laminated in the substrate, the number of basic layers laminated being determined based on a design thickness of the substrate, the design thickness being calculated from a volume of the substrate and a volume of the rib. Doubler layers that are the composite material layers are laminated in at least a rib base bottom portion of the substrate in addition to the basic layers, the rib standing at the rib base bottom portion. The reinforced fibers reach a tip portion of the rib.

A method of manufacturing a composite material panel structural body according to the present disclosure is a method of manufacturing a composite material panel structural body which includes a substrate and a rib standing with respect to the substrate and also includes a composite material containing reinforced fibers and a matrix resin. The method includes: forming a prepreg laminated body by laminating basic plies that are prepregs, the number of basic plies being a value by which the substrate has a design thickness and laminating doubler plies that are prepregs at a rib base bottom portion of the substrate, the rib standing at the rib base bottom portion; and subjecting the prepreg laminated body to press-forming with a forming die.

According to the above configuration, the doubler layers that exceed a reference lamination number are laminated in the rib base bottom portion. Therefore, the reinforced fibers reach the tip portion of the rib. With this, the panel structural body having a reinforcement structure can be manufactured only by the press-forming, and the reinforced fibers can reach the tip portion of the rib that is the reinforcement structure regardless of the thicknesses and heights of the substrate and the rib. Therefore, the strength and rigidity of the substrate can be made satisfactory. Thus, the panel structural body having satisfactory strength and rigidity can be manufactured at low cost.

The above object, other objects, features, and advantages of the present disclosure will be made clear by the following detailed explanation of preferred embodiments with reference to the attached drawings.

BRIEF DESCRIPTION OF THE DRAWINGS

FIGS. 4A and 4B are schematic sectional views each showing one example of a prepreg laminated body used to manufacture the panel structural body in the present embodiment.

DESCRIPTION OF THE PREFERRED EMBODIMENTS

Figure 1:
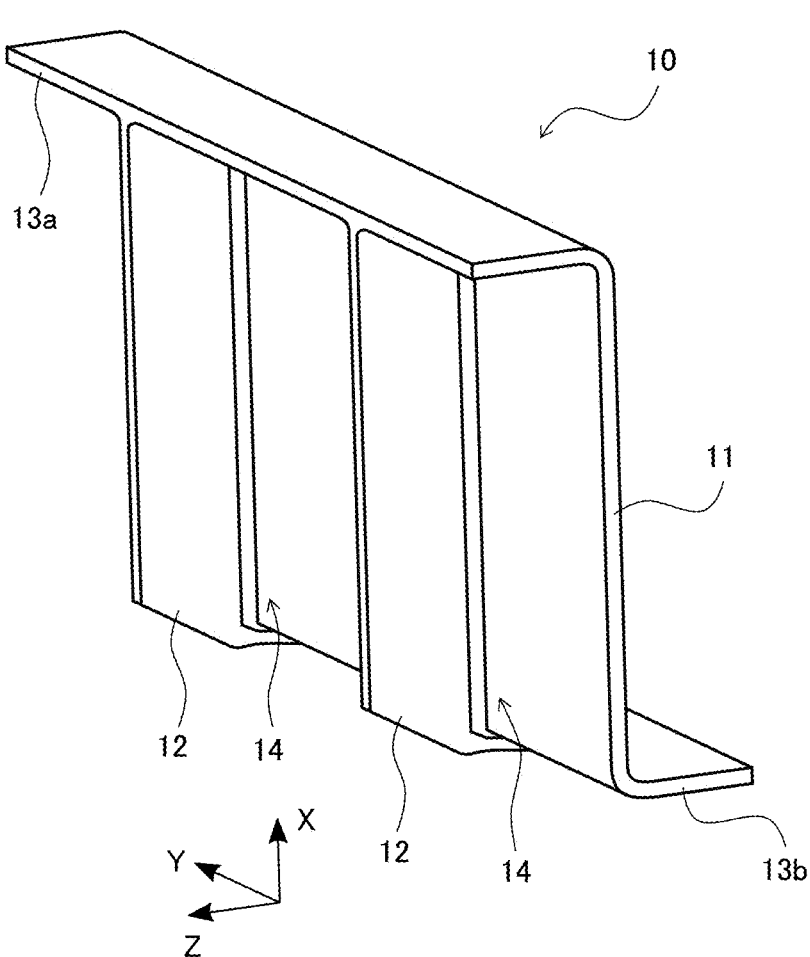
FIG. 1 is a schematic perspective view showing one example of the configuration of a panel structural body according to an embodiment.

Hereinafter, a typical embodiment of the present disclosure will be described with reference to the drawings. In the following description and the drawings, the same reference signs are used for the same or corresponding components, and the repetition of the same explanation is avoided.

Composite Material Panel Structural Body

A typical example of a composite material panel structural body according to the present disclosure will be specifically described with reference to FIGS. 1 and 2. The composite material panel structural body is also referred to as a "panel structural body".

The panel structural body according to the present embodiment is a press-formed article made of a composite material containing a reinforced fiber and a matrix resin. A specific configuration of the panel structural body is not especially limited. For example, as shown in FIG. 1, a panel structural body 10 includes a web portion 11, ribs 12, and flange portions 13*a* and 13*b*. Herein, for convenience of explanation, a direction in which the rib 12 extends along the web portion 11 is referred to as an x-axis, a direction in which the flange portions 13*a* and 13*b* extend is referred to as a y-axis, and a direction in which the rib 12 stands is referred to as a z-axis.

In the present embodiment, the web portion 11 is a substrate, and a portion of the web portion 11 at which the rib 12 stands is a rib base bottom portion 14.

As shown in FIG. 1, a transverse section of the panel structural body 10 has a "Z shape". The flange portion 13*a* is located at one of side edge portions of the web portion 11 having a flat plate shape. The flange portion 13*a* extends in a z-axis direction toward a first surface of the web portion 11. The flange portion 13*a* also extends in a y-axis direction. The flange portion 13*b* is located at the other side edge portion of the web portion 11. The flange portion 13*b* extends in the z-axis direction toward a second surface that is a surface opposite to the first surface. The flange portion 13*b* also extends in the y-axis direction. The rib 12 stands on the first surface of the web portion 11 so as to extend in the z-axis direction. The rib 12 extends in an x-axis direction that is a direction from one of the side edge portions of the web portion 11 toward the other. One of end portions of the rib 12 is in connection with the flange portion 13*a*.

A specific shape and thickness of the substrate of the panel structural body 10 are not especially limited and may be suitably designed depending on its use. In addition, a specific shape, thickness, and height of the rib 12 are not especially limited. When the panel structural body 10 includes the flange portion 13*a*, the flange portion 13*b*, or another structural part, for example, the thickness, the width and the height can be suitably set depending on various conditions, such as the type, use, and use condition of the panel structural body 10.

Rib and Rib Base Bottom Portion

Next, the rib 12 and the rib base bottom portion 14 of the panel structural body 10 will be described with reference to FIG. 2. FIG. 2 is a schematic diagram showing a sectional configuration of the rib 12 and the rib base bottom portion 14 in the panel structural body 10 shown in FIG. 1.

Figure 2:
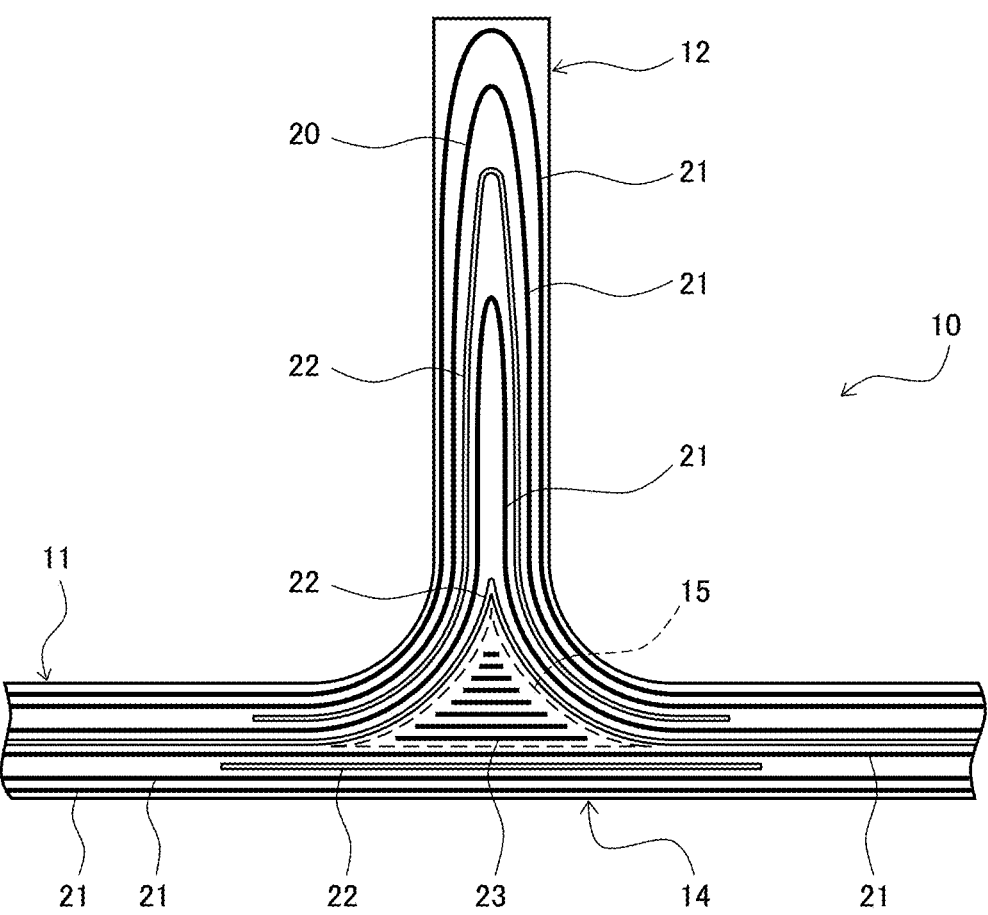
FIG. 2 is a schematic sectional view showing one example showing a typical configuration of a rib and a rib base bottom portion which are included in the panel structural body shown in FIG. 1.

A lateral direction in FIG. 2 corresponds to the x-axis direction, and a vertical direction in FIG. 2 corresponds to the z-axis direction. Moreover, an upper surface of the web portion 11 in FIG. 2 corresponds to the first surface of the substrate, and a lower surface of the web portion 11 in FIG. 2 corresponds to the second surface of the substrate.

The panel structural body 10 includes at least the reinforced fibers and the matrix resin. The substrate includes a laminated structure including composite material layers containing reinforced fibers. In FIG. 2, layers of the reinforced fibers are schematically shown by thick lines or white lines, and layers containing the reinforced fibers are composite material layers.

A "design thickness" of the web portion 11 and a "reference lamination number" that is the number of layers laminated for realizing the design thickness of the web portion 11 are set. The design thickness and the reference lamination are set in advance depending on, for example, the use of the panel structural body 10. The web 11 includes only the reference lamination number of composite material layers. The design thickness is the thickness defined in the design specifications of the panel structural body 10.

In the example shown in FIG. 2, the web portion 11 includes six composite material layers 21 schematically shown by the thick lines as the layers of the reinforced fibers. However, the number of composite material layers 21 is not limited to six. The number of composite material layers 21 may be determined in accordance with the actual thickness of the panel structural body 10 and the like. Moreover, in FIG. 2, intervals of the composite material layers 21 are not equal to each other, but this is merely for convenience sake in the drawing.

The composite material layers 21 that realize the design thickness of the web portion 11 in FIG. 2 are referred to as "basic layers 21" for convenience sake. Most of the web portion 11 is constituted only by the basic layers 21. Doubler layers 22 that are the composite material layers other than the basic layers 21 are laminated in the rib base bottom portion 14. In other words, the doubler layers 22 are the composite material layers laminated such that the number of layers laminated exceeds the reference lamination number. In FIG. 2, the doubler layers 22 are shown by the white lines as the composite material layers so as to be distinguished from the basic layers 21.

In the example shown in FIG. 2, the number of doubler layers 22 laminated is three. However, the specific number of doubler layers 22 laminated is not especially limited.

A preferable range of the number of doubler layers 22 laminated can be set based on a designed volume of the panel structural body 10. For example, the volume of the total of the number of basic layers 21 laminated and the number of doubler layers 22 laminated is a value within a range of not less than the forming reference volume and not more than 1.25 times the forming reference volume, the forming reference volume being a designed volume of the composite material panel structural body. Generally, the forming reference volume can be set based on a cavity of a forming die used for press-forming.

In theory, the substrate and the rib 12 can be formed by laminating the composite material layers the number of which is a value that realizes the design thickness. However, according to the diligently studies of the present inventors, it was found that even when a prepreg laminated body including the layers the number of which is the value that realizes the design thickness is subjected to the press-forming, the rib 12 is not appropriately formed in some cases. Therefore, it is preferable that when performing the press-forming of the panel structural body 10 including the rib 12, the number of doubler layers 22 laminated be set based on the forming reference volume.

For example, when the number of doubler layers 22 laminated is less than 1.0 time that is equal to the forming reference volume, the rib 12 may not be appropriately formed by the press-forming even if the doubler layers 22 are additionally laminated. On the other hand, when the number of doubler layers 22 laminated exceeds 1.25 times the forming reference volume, the fiber volume content rate of the rib 12 and the rib base bottom portion 14 may become excessive in theory.

When the doubler layers 22 are added to the basic layers 21, a matrix resin 20 is also added to the layers of the reinforced fibers. It is thought that when the volume of the laminated composite material layers increases by the addition of the doubler layers 22, the matrix resin 20 flows out to portions other than the rib 12 and the rib base bottom portion 14. Therefore, the fiber volume content rate of the rib 12 and the rib base bottom portion 14 can be regarded as increasing.

Generally, an upper limit of the fiber volume content rate which does not cause the deterioration of the strength is +5% of a nominal value. Mathematically, if the additional number of doubler layers 22 for the basic layers 21 is set so that the volume of a total of the basic layers 21 laminated and the number of doubler layers 22 laminated is not more than 1.25 times the forming reference volume, the number of doubler layers 22 laminated can be regarded as corresponding to the upper limit of the fiber volume content rate. Needless to say, even when the number of doubler layers 22 laminated is set so that the volume of a total of the basic layers laminated and the number of doubler layers laminated exceeds 1.25 times the forming reference volume, no problems occur in some cases depending on conditions.

As shown in FIG. 2, in the panel structural body 10, the doubler layers 22 are laminated additionally to the basic layers 21. Therefore, the reinforced fibers reach a tip portion of the rib 12. In FIG. 2, two doubler layers 22 and three basic layers 21 are shown in the rib 12. However, the present embodiment is not limited to this.

Moreover, in the panel structural body 10 according to the present embodiment, in addition to the doubler layers 22, filler layers 23 that are the composite material layers may be laminated in a filler region 15 shown by a broken line in the rib base bottom portion 14. The filler region 15 and the filler layer 23 will be specifically described based on FIG. 3A further schematically showing a schematic sectional structure of the rib base bottom portion 14 shown in FIG. 2.

Figure 3A:
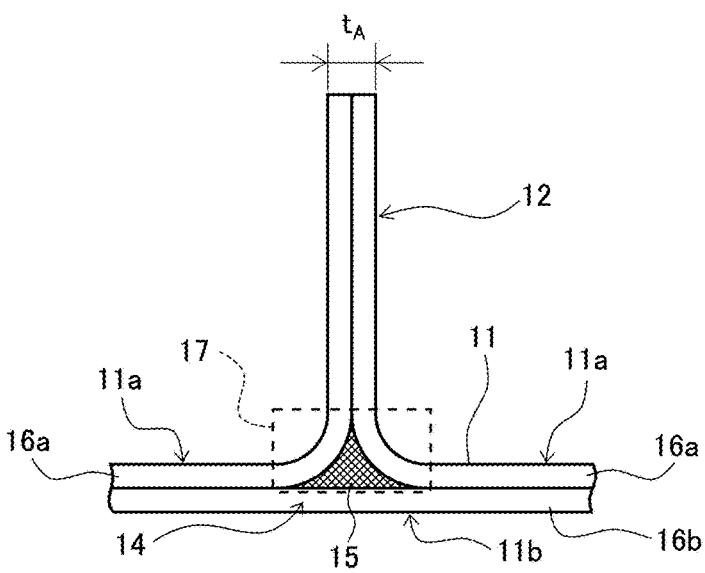
FIG. 3A is a diagram further schematically showing a sectional structure of the rib and the rib base bottom portion shown in FIG. 2.

For convenience of explanation, the first surface is referred to as a "first surface 11a", and the second surface is referred to as a "second surface 11b", and these reference signs are shown in FIG. 3A.

As shown in FIG. 3A, the composite material layers included in the substrate can be schematically divided into first surface laminated bodies 16a and a second surface laminated body 16b. The first surface laminated bodies 16a are portions, close to the first surface 11a, of the web portion 11 that is the substrate. The second surface laminated body 16b is a portion, close to the second surface 11b, of the web portion 11 that is the substrate.

The rib 12 includes two first surface laminated bodies 16a opposed to and attached to each other. At a root of the rib 12, the two first surface laminated bodies 16a are curved and bent so as to extend in respective directions opposite to each other along the y-axis direction. Therefore, the rib 12 stands from the substrate that is the web portion 11. Moreover, the second surface laminated body 16b is located so as to contact surfaces, close to the second surface 11b, of the first surface laminated bodies 16a.

According to this structure, as shown in a schematic sectional view of FIG. 3A, the filler region 15 having a triangular section is defined among the rib 12, the first surface laminated bodies 16a, and the second surface laminated body 16b. The filler region 15 is a thin and long region having a triangular section extending along the x-axis direction. In FIG. 3A, an extending direction of the rib 12 is a direction perpendicular to a paper surface.

Filler Region

As shown in FIGS. 3A and 2, the filler region 15 is included in the rib base bottom portion 14 of the web portion 11. In the present embodiment, the filler layers 23 are laminated only in a portion corresponding to the filler region 15 of the rib base bottom portion 14.

In addition to the doubler layers 22, the filler layers 23 are laminated in the rib base bottom portion 14 as the composite material layers which exceed the reference lamination number. With this, the quality of a portion of especially the second surface 11b of the panel structural body 10 which is located at an opposite side of the rib 12, i.e., at a side opposed to the rib 12 standing on the first surface 11a can be further improved.

Although it depends on conditions, a recess may be generated at a position of the second surface 11b of the panel structural body 10 when only the doubler layers 22 are additionally laminated, but the filler layers 23 are not additionally laminated. The location of the recess should correspond to the rib 12. This recess may influence the function, strength, and the like of the panel structural body 10 depending on the use of the panel structural body 10. This recess also may deteriorate the surface quality.

For example, when the panel structural body 10 is used as one of components, and the second surface 11b of the panel structural body 10 is located at a structurally outermost side, it is preferable that the second surface 11b do not include the recess. Or, when the second surface 11b of the panel structural body 10 is brought into tight contact with another component, it is preferable that the second surface 11b do not include the recess. Moreover, when the web portion 11 of the panel structural body 10 is required to have strength, it is preferable that the second surface 11b do not have the recess. This is because when the recess exists on the second surface 11b, the deterioration of the strength of the panel structural body 10 occurs by the waves of the fibers. In the above use, it is preferable that in addition to the doubler layers 22, the filler layers 23 be additionally laminated in the rib base bottom portion 14.

When additionally laminating the filler layers 23, the specific number of filler layers 23 laminated is not especially limited. For example, when no problems occur even if the recess is generated on the second surface 11b, the filler layer 23 is unnecessary. Moreover, when moderately reducing the recess of the second surface 11b is enough, the filler layers 23 may be appropriately and additionally laminated in accordance with the designed volume of the filler region 15.

Furthermore, when avoiding the generation of the recess on the second surface 11b, it is preferable that when the designed volume of the filler region 15 is referred to as a filler reference volume, a volume of the laminated filler layers 23 be set to a value within a range of not less than the filler reference volume and not more than 3.0 times the filler reference volume. Mathematically, when the amount of the filler layers 23 added is not more than 3.0 times the filler reference volume, the amount of the filler layers 23 added is regarded as corresponding to the upper limit of the fiber volume content rate, i.e., +5% of the nominal value.

If the volume of the laminated filler layers 23 is less than the filler reference volume, the generation of the recess on the second surface 11b may not be avoided. On the other hand, when the volume of the laminated filler layers 23 exceeds 3.0 times the filler reference volume, the fiber volume content rate of the rib base bottom portion 14 may become excessive.

Herein, as described above, the forming reference volume that is a reference of the number of doubler layers 22 laminated may be set based on the cavity of the forming die used for the press-forming. The filler reference volume that is a reference of the number of filler layers 23 laminated can be theoretically calculated based on the thickness of the rib 12 and the degree of curve at and around the rib base bottom portion 14.

Figure 3B:
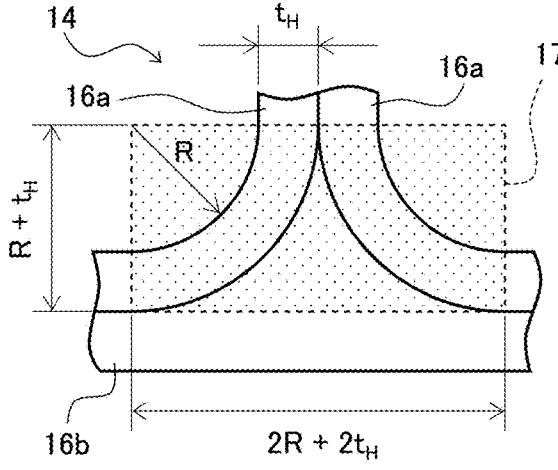
FIG. 3B is a diagram schematically showing a rib base bottom region included in the rib base bottom portion shown in FIG. 3A.
Figure 3C:
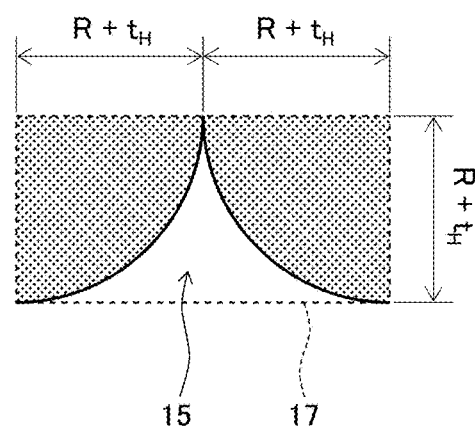
FIG. 3C is a diagram schematically showing a region except for a filler region for theoretically calculating the rib base bottom region shown in FIG. 3B.

A method of calculating the filler reference volume will be specifically described based on FIGS. 3B and 3C in addition to FIG. 3A. FIG. 3B is an enlarged schematic diagram showing the rib base bottom portion 14 of FIG. 3A. FIG. 3C is a schematic diagram showing a rib base bottom region 17 shown in FIGS. 3A and 3B.

The above filler region 15 can be set as a region between the first surface laminated bodies 16a and the second surface laminated body 16b. The first surface laminated bodies 16a are located at a side, close to the first surface 11a, of the rib base bottom portion 14 and are opposed to each other. The second surface laminated body 16b is located at a side, close to the second surface 11b, of the rib base bottom portion 14 and is opposed to the first surface laminated bodies 16a. Moreover, the rib base bottom region 17 surrounded by a broken line in FIG. 3A is set as a region including curved portions of the first surface laminated bodies 16a opposed to each other in the rib base bottom portion 14; and the filler region 15 between these curved portions.

The rib base bottom region 17 will be more specifically described. As shown in FIG. 3B, the curved portion of the first surface laminated body 16a is approximated to a quadrant having a radius R, i.e., a fan shape which has a center angle of 90° and is obtained by dividing a perfect circle having the radius R into four parts. At this time, a thickness tH of the first surface laminated body 16a is tA/2 that is half a thickness to of the rib 12. A length of the rib base bottom region 17 in the z-axis direction is R+tH. A length of the rib base bottom region 17 in the y-axis direction is 2R+2tH. Furthermore, as shown in FIG. 3C, in a transverse section of the rib base bottom region 17, a shaded region that does not include the filler region 15 can be approximated to a figure that quadrants each having a radius R+tH are located side by side in the y-axis direction.

Therefore, the area of the transverse section of the filler region 15 can be calculated by subtracting π×(R+tH)2×(²⁄₄) from (R+tH)×(2R+2tH). π×(R+tH)2×(²⁄₄) is the area of the shaded region shown in FIG. 3C. (R+tH)×(2R+2tH) is the area of the rib base bottom region 17. The filler region 15 is a thin and long region that extends along the extending direction of the rib 12 which is the x-axis direction. Therefore, the volume of the filler region 15 can be calculated by multiplying the area of the transverse section of the filler region 15 by the length of the rib 12. At that time, the volume of the filler region 15 is the filler reference volume, and the length of the rib 12 is the length of the filler region 15.

Prepreg and Laminated Body

Figures 4A, 4B:
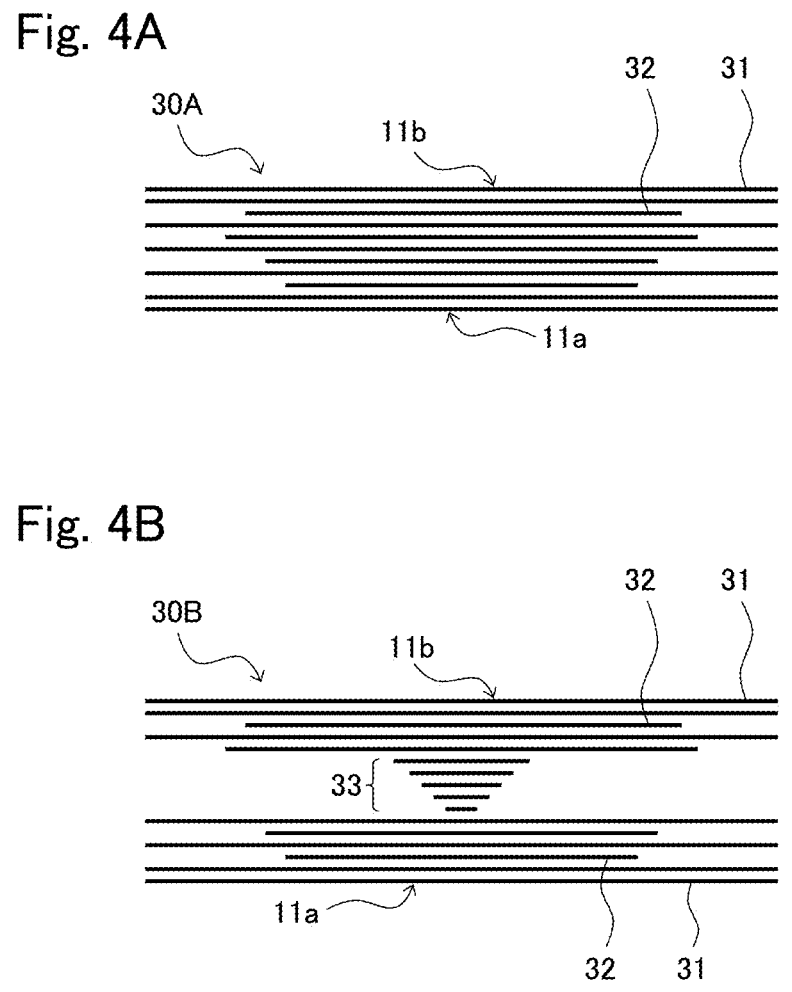

Next, prepregs and laminated bodies which are used to manufacture the panel structural body 10 will be described with reference to FIGS. 4A and 4B. As with FIG. 3A, for convenience of explanation, the first surface and the second surface are respectively referred to as the "first surface 11a" and the "second surface 11b", and these reference signs are shown in FIGS. 4A and 4B. In the examples shown in FIGS. 4A and 4B, the first surface 11a is located at a lower side, and the second surface 11b is located at an upper side.

As described above, the panel structural body 10 according to the present embodiment is a "press-formed body" manufactured by the press-forming. When manufacturing the panel structural body 10 having the above configuration, prepregs are generally used. The prepreg is a sheet body prepared by impregnating a base material made of reinforced fibers with the matrix resin 20.

In a typical example of the present embodiment, first, prepregs are laminated to form a prepreg laminated body 30A or 30B shown in FIG. 4A or 4B. The panel structural body 10 is manufactured by subjecting the prepreg laminated body 30A or 30B to the press-forming. A more specific method of manufacturing the panel structural body 10 according to the present disclosure will be described later.

Before the press-forming is performed, each of the basic layer 21 and the doubler layer 22 is the prepreg, i.e., the sheet body prepared by impregnating the base material with the matrix resin 20. In FIGS. 4A and 4B, the prepreg corresponding to the basic layer 21 is shown as a basic ply or plies 31, and the prepreg corresponding to the doubler layer 22 is shown as a doubler ply or plies 32.

The prepreg laminated body 30A shown in FIG. 4A includes the basic plies 31 and the doubler plies 32. The prepreg laminated body 30B shown in FIG. 4B includes the basic plies 31 and the doubler plies 32, and in addition, filler plies 33 located at a portion corresponding to the filler region 15.

Herein, in each of the prepreg laminated bodies 30A and 30B, the doubler plies 32 are laminated at a position corresponding to at least the rib 12. However, the dimension, shape, and the like of the doubler ply 32 are not limited.

In the prepreg laminated body 30B, the filler plies 33 are laminated at a position corresponding to the filler region 15 so as to have a triangular sectional shape corresponding to the filler region 15. In the example shown in FIG. 4B, the filler plies 33 are laminated in a middle portion of the prepreg laminated body 30B so as to have a triangular shape that gradually decreases in width toward the first surface 11a.

The number of basic plies 31 laminated, the number of doubler plies 32 laminated, and the number of filler plies 33 laminated are not especially limited. The number of basic plies 31 laminated, the number of doubler plies 32 laminated, and the number of filler plies 33 laminated can be suitably set based on the thicknesses of the substrate and the rib 12 which specified in the design specifications of the panel structural body 10 to be manufactured, the volume of the cavity of the forming die, the designed volume of the filler region 15, and the like. The thicknesses of the substrate and the rib 12 correspond to, for example, the above design thickness. The volume of the cavity corresponds to the above forming reference volume. The designed volume of the filler region 15 is based on the above filler reference volume.

The doubler ply 32 becomes the doubler layer 22 of the panel structural body 10 by the press-forming. The filler ply or plies 33 becomes the filler layer 23 of the panel structural body 10 by the press-forming. Therefore, the volume of the number of doubler plies 32 laminated can be set so that the volume of a total of the basic plies 31 laminated and the number of doubler plies 32 laminated is within a range of not less than the volume of the cavity of the forming die and not more than 1.25 times the volume of the cavity. This is within a range of not less than 1.0 time the forming reference volume and not more than 1.25 times the forming reference volume. Similarly, the number of filler plies 33 laminated can be set so that the volume of the filler plies 33 is within a range of not less than the filler reference volume and not more than 3.0 times the filler reference volume.

Moreover, a method of setting the number of composite material layers laminated or the number of prepregs laminated based on the reference volume, such as the forming reference volume or the filler reference volume, is not especially limited, and knowledge of conventional manufacturing methods can be utilized.

Specific types of the matrix resin 20 and the reinforced fiber which are included in the prepreg are not especially limited. As the matrix resin 20 and the reinforced fiber, known applicable materials can be suitably selected and used depending on, for example the use of the panel structural body 10.

Typical examples of the matrix resin 20 used in the composite material include a thermosetting resin and a thermoplastic resin. A specific type of the thermosetting resin is not especially limited. Typical examples of the thermosetting resin include epoxy resin, polyester resin, vinylester resin, phenol resin, cyanate ester resin, polyimide resin, and polyamide resin.

These thermosetting resins may be used alone or in combination of plural types. Moreover, more specific chemical structures of these thermosetting resins are not especially limited. The thermosetting resin may be a polymer formed by polymerizing known various monomers or may be a copolymer formed by polymerizing monomers. Furthermore, an average molecular weight, structures of a main chain and a side chain, and the like of the thermosetting resin are not especially limited.

A specific type of the thermoplastic resin is not especially limited. However, engineering plastic, such as polyphenylene sulfide (PPS), polyether ether ketone (PEEK), and polyether imide (PEI), are preferably used. More specific chemical structures of these thermoplastic resins are not especially limited.

The thermoplastic resin may be a polymer formed by polymerizing known various monomers or may be a copolymer formed by polymerizing monomers. Moreover, an average molecular weight, structures of a main chain and a side chain, and the like of the thermoplastic resin are not especially limited.

Components, such as a known additive, may be added to the matrix resin 20. Examples of the additive include known curing agents, curing accelerators, and reinforcing materials and filling materials other than fiber base materials. Specific types, compositions, and the like of these additives are not especially limited, and an additive of a known type or composition may be suitably used.

When the matrix resin 20 contains a component other than the resin, the matrix resin 20 can be regarded as a resin composition constituted by the resin and the component.

A specific type of the reinforced fibers is not especially limited. Examples of the reinforced fibers include carbon fibers, polyester fibers, polyparaphenylene benzobisoxazole (PBO) fibers, boron fibers, aramid fibers, glass fibers, silica fibers, also known as quartz fibers, silicon carbide (SiC) fibers, and nylon fibers. These reinforced fibers may be used alone or in suitable combination of two or more types. Moreover, the base material of the reinforced fibers is not especially limited. Typical examples of the base material of the reinforced fibers include woven fabric, braid fabric, knit fabric, and nonwoven fabric.

Continuous fibers or long fibers may be used as the reinforced fibers. The long fibers refer to fibers which are discontinuous fibers but are long. Moreover, plural types of fibrous materials, filling materials, or reinforcing materials may be used as the reinforced fibers. For example, as the reinforced fibers, short fibers may be used in addition to the continuous fibers, or a filling material or a reinforcing material which is not of a fiber type but is of a particle type may be used, i.e., a filler may be used. As the filling material or the reinforcing material, known fillers or known reinforcing materials may be suitably used in accordance with the type of the composite material or the type of the matrix resin 20.

In the present disclosure, it is preferable that the reinforced fibers be at least one of the continuous fibers or slit continuous fibers. In other words, it is preferable that the reinforced fibers used in the prepreg be the continuous fibers. The continuous fibers may include slits or may not include the slits, or the continuous fibers with the slits and the continuous fibers without the slits may be used in combination. When the reinforced fibers include the slits, the continuous fibers may be base materials, such as woven fabric or braid fabric. Moreover, the slits may be partially or entirely formed at the base materials.

Method of Manufacturing Panel Structural Body

Next, a method of manufacturing the panel structural body will be specifically described with reference to FIGS. 5A, 5B, 6A, 6B, 7A, and 7B.

FIG. 1 shows that the panel structural body 10 includes the flange portions 13*a* and 13*b*. However, for convenience of explanation of the formation of the rib 12 by the press-forming, the formation of the flange portions 13*a* and 13*b* is not shown in FIGS. 5A, 5B, 6A, 6B, 7A, and 7B.

In the present embodiment, a method of manufacturing the panel structural body 10 by subjecting the prepreg laminated body 30A to the press-forming is referred to as a first illustrative manufacturing method. Moreover, a method of manufacturing the panel structural body 10 by subjecting the prepreg laminated body 30B to the press-forming is referred to as a second illustrative manufacturing method.

Figure 5A:
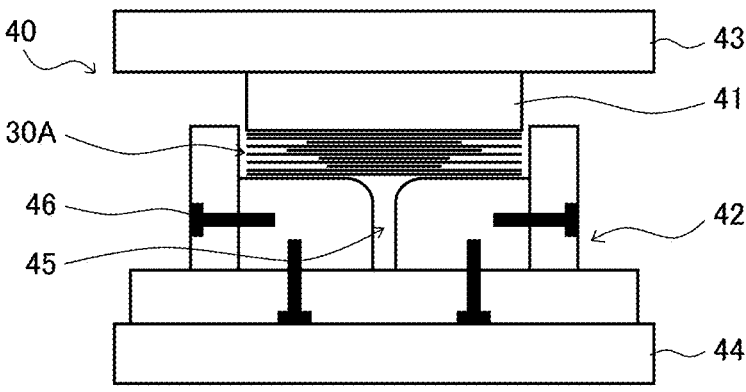
FIG. 5A is a schematic diagram showing a typical example of a forming die used when manufacturing the panel structural body shown in FIG. 1 by press-forming using the laminated body shown in FIG. 4A.

As shown in FIG. 5A, a forming die 40 used at the time of the press-forming is used to manufacture the panel structural body 10. The forming die 40 includes an upper die 41, a lower die 42, an upper hot plate 43, a lower hot plate 44, and the like.

In the example shown in FIG. 5A, the upper die 41 corresponds to the second surface of the web portion 11 that is the substrate, and the lower die 42 corresponds to the first surface of the web portion 11 and the rib 12. A cavity 45 at which the prepreg laminated body 30A is placed is formed between the upper die 41 and the lower die 42. The cavity 45 includes spaces corresponding to the flange portions 13*a* and 13*b*, but the spaces corresponding to the flange portions 13*a* and 13*b* are not shown.

The upper hot plate 43 is located outside the upper die 41, and the lower hot plate 44 is located outside the lower die 42. The outside of the upper die 41 is an upper side, and the outside of the lower die 42 is a lower side. Heat and pressure are applied from the hot plates 43 and 44 to the upper die 41 and the lower die 42. With this, the prepreg laminated body 30A interposed between the upper die 41 and the lower die 42 is subjected to heating and pressing, i.e., hot pressing, and thus, the panel structural body 10 is formed.

The lower die 42 includes a recess structure corresponding to at least the rib 12. Therefore, in the example shown in FIG. 5A, the lower die 42 has such a configuration that die members are fastened and fixed to each other with fasteners 46. The configuration of the forming die 40 is not limited to the configuration shown in FIG. 5A.

Figure 5B:
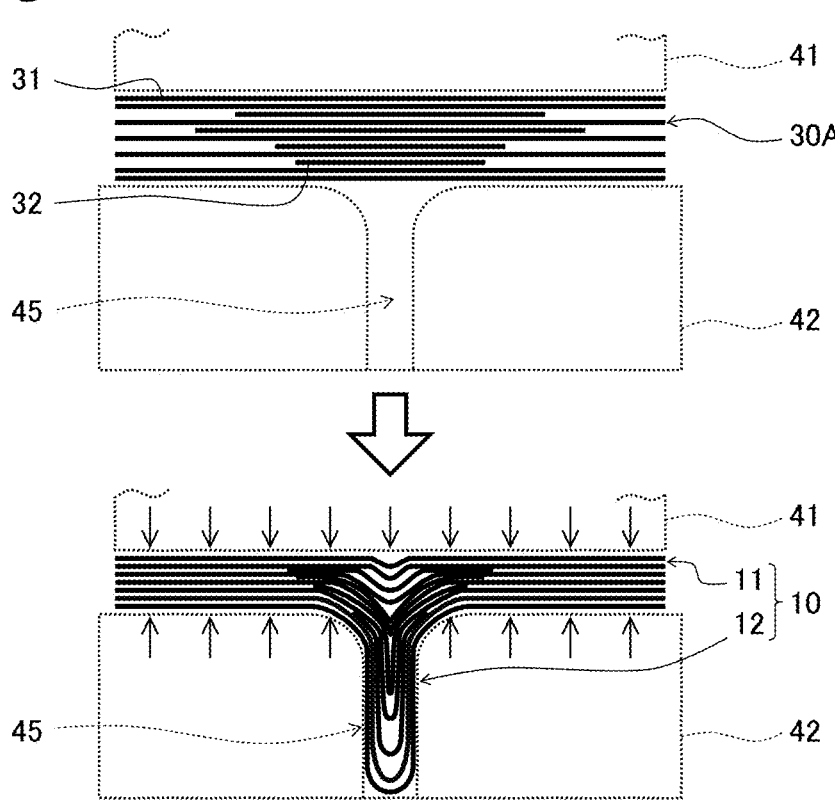
FIG. 5B is a partial enlarged schematic diagram showing the prepreg laminated body and a cavity of the forming die in the schematic diagram shown in FIG. 5A.

As shown in an upper side of FIG. 5B, first, the prepreg laminated body 30A is arranged between the upper die 41 and the lower die 42. Next, as shown in a lower side of FIG. 5B, the upper die 41 and the lower die 42 are subjected to heating and pressing, i.e., hot pressing by the upper hot plate 43 and the lower hot plate 44. Arrows in the lower side of FIG. 5B show pressing directions. By such press-forming, the matrix resin 20 constituting the basic plies 31 and the doubler plies 32 which are the prepregs flows, and the reinforced fibers also flow or stretch together with the matrix resin 20. Or, the reinforced fibers may flow and stretch.

As a result, the doubler plies 32 are introduced together with the basic plies 31 into a space of the cavity 45 which corresponds to the rib 12. With this, as shown in the lower side of FIG. 5B, the composite material layers derived from the basic plies 31 and the doubler plies 32 are formed at the rib 12, and the reinforced fibers reach the tip portion of the rib 12. Therefore, the strength and rigidity of the rib 12 located at the substrate can be improved.

Generally, when a composite material formed article includes a complex three-dimensional structure, such as the rib 12, the prepregs are laminated so as to form a three-dimensional shape corresponding to such complex shape. Therefore, a time required for the laminating is long. Moreover, since it is normally difficult to subject a laminated body in which the prepregs are laminated to have the complex three-dimensional shape, to the press-forming, autoclave molding is practically used. However, a molding time of the autoclave molding is long. Manufacturing the panel structural body including the three-dimensional structure by using prior art as above requires a large amount of time. Therefore, mass production by using prior art as above is difficult.

On the other hand, according to the present embodiment, since the prepreg laminated body 30A has a substantially flat plate shape, the prepreg laminated body 30A can be subjected to the press-forming. Therefore, the panel structural body having the complex three-dimensional shape including the rib 12 can be easily manufactured by the present embodiment at low cost. Moreover, it is conventionally difficult to make the continuous fibers exist at the tip of the rib of the panel structural body in which the thicknesses and heights of the substrate and the rib are not limited. However, by subjecting the prepreg laminated body 30A in which the doubler layers 22 are added to the rib base bottom portion 14, to the press-forming, the reinforced fibers can be arranged at the entire rib 12 including the tip portion and the entire rib base bottom portion 14. Therefore, the panel structural body 10 having improved strength and rigidity can be manufactured.

Figure 6A:
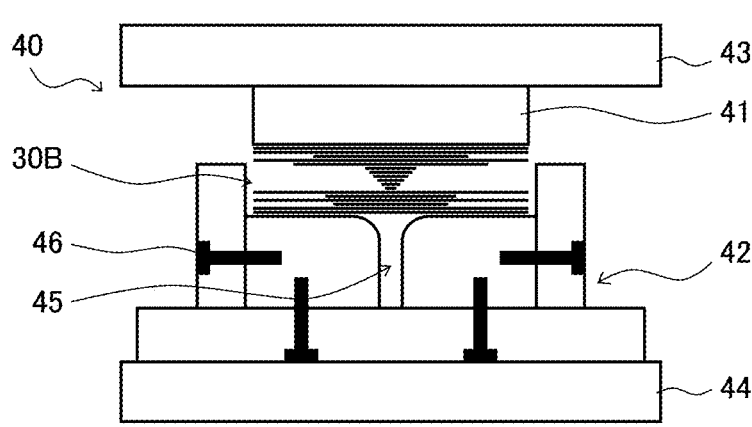
FIG. 6A is a schematic diagram showing another example of the forming die used when manufacturing the panel structural body shown in FIG. 1 by the press-forming using the laminated body shown in FIG. 4B.

Next, the second illustrative manufacturing method will be described with reference to FIGS. 6A and 6B. In the example shown in FIGS. 6A and 6B, the upper die 41 corresponds to the second surface of the web portion 11 that is the substrate, and the lower die 42 corresponds to the first surface of the web portion 11 and the rib 12.

Figure 6B:
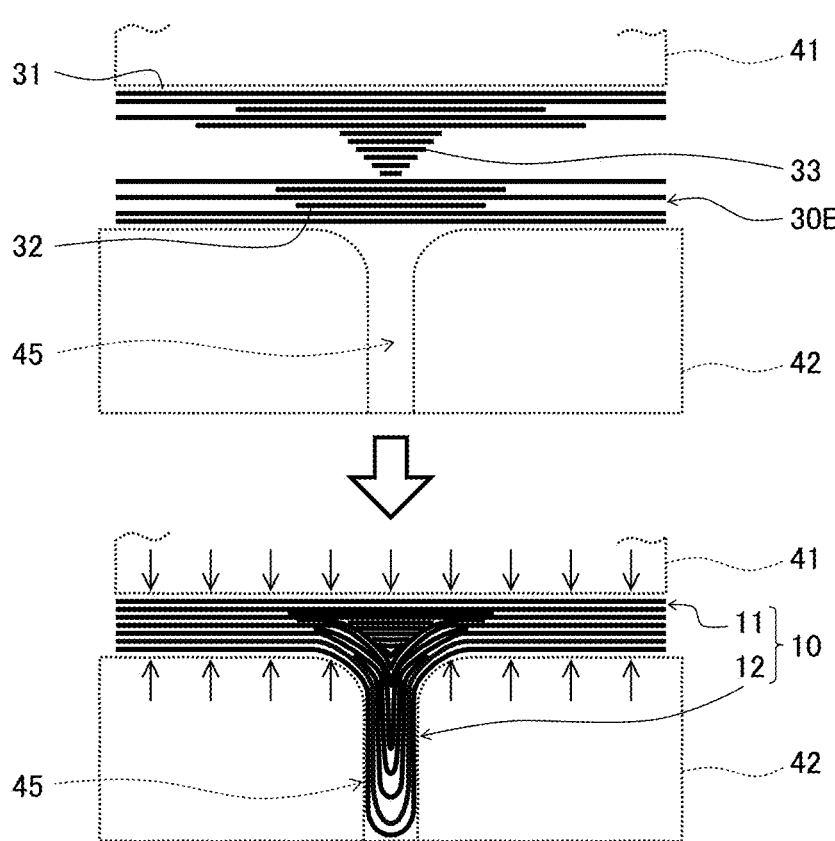
FIG. 6B is a partial enlarged schematic diagram showing the prepreg laminated body and the cavity of the forming die in the schematic diagram shown in FIG. 6A.

As shown in an upper side of FIG. 6B, first, the prepreg laminated body 30B is arranged between the upper die 41 and the lower die 42 such that the laminated filler plies 33 have an inverted triangular shape.

Next, as shown in FIG. 6B, the upper die 41 and the lower die 42 are subjected to heating and pressing, i.e., hot pressing by the upper hot plate 43 and the lower hot plate 44, and the prepreg laminated body 30B between the upper die 41 and the lower die 42 is subjected to the press-forming. At this time, the matrix resin 20 constituting the basic plies 31, the doubler plies 32, and the filler plies 33 which are the prepreg flows, and the reinforced fibers also flow or stretch together with the matrix resin 20. Or, the reinforced fibers may flow and stretch.

As a result, the doubler plies 32 are introduced together with the basic plies 31 into a space of the cavity 45 which corresponds to the rib 12. Moreover, the filler plies 33 are introduced into a space of the cavity 45 which corresponds to the filler region 15. With this, the composite material layers derived from the basic plies 31 and the doubler plies 32 are formed at the rib 12, and the reinforced fibers reach the tip portion of the rib 12.

Moreover, the composite material layers derived from the filler plies 33 are formed in the filler region 15 of the rib base bottom portion 14. The reinforced fibers are arrange at the entire rib 12, and the filler region 15 is satisfactorily filled with the filler layers 23. Therefore, the strength of the rib 12 can be improved, and the generation of the recess on the second surface of the web portion 11 that is the substrate can be avoided or suppressed.

Figure 7A:
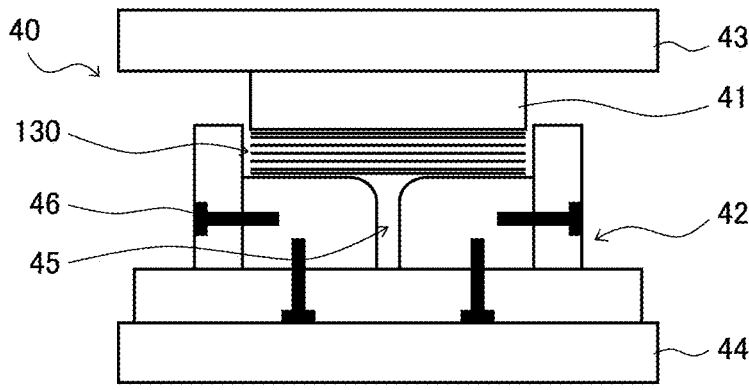
FIG. 7A is a schematic diagram showing a typical example of the forming die used when manufacturing the panel structural body shown in FIG. 1 using a conventional prepreg laminated body.
Figure 7B:
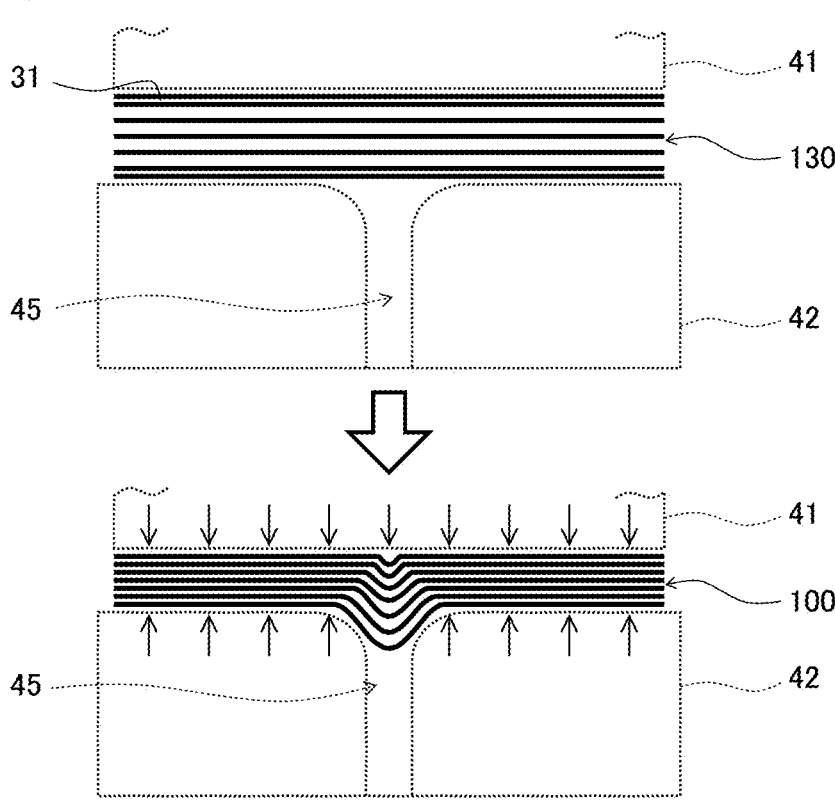
FIG. 7B is a partial enlarged schematic diagram showing the prepreg laminated body and the cavity of the forming die in the schematic diagram shown in FIG. 7A.

On the other hand, according to prior art, as shown in FIGS. 7A and 7B, since a prepreg laminated body 130 including only the basic plies 31 is subjected to the press-forming, the reinforced fibers do not adequately flow or stretch. Therefore, in a conventional comparative panel structural body 100, the reinforced fibers are not adequately arranged at the rib 12. Moreover, as shown in a lower side of FIG. 7B, the recess may be generated on the second surface, located at an opposite side of the rib 12, of the web portion 11 that is the substrate.

In the present disclosure, in addition to the basic layers, the doubler layers as the composite material layers that are mathematically "excessive" are added. From the viewpoint of common general technical knowledge, it is thought that even when the doubler layers that are the excessive composite material layers are added at and around the rib base bottom portion, the reinforced fibers cannot be arranged at the entire rib. To be specific, according to common general technical knowledge, it is difficult to think that the reinforced fibers satisfactorily flow or stretch at the time of the press-forming. Therefore, it is thought that the reinforced fibers are not arranged at the entire rib. However, as a result of the diligent studies by the present inventors, it was found that by adding the doubler layers, the reinforced fibers can reach the tip portion of the rib.

Moreover, as a result of the diligent studies by the present inventors, it was found that a region that is called the "filler region" defined in the present disclosure and exists at the rib base bottom portion in the press-forming. Therefore, in the present disclosure, the composite material layers that fill the filler region are further added, i.e., the filler layers are further added. With this, first, the reinforced fibers can reach the tip portion of the rib. In addition to this, the possibility of the generation of the recess on the second surface of the panel structural body can be effectively suppressed or avoided. It was found by experimental verifications by the present inventors that regardless of the thicknesses of the substrate and the rib, the reinforced fibers can reach the tip portion of the rib, and the recess on the second surface of the panel structural body can be suppressed or avoided.

Figure 8A:
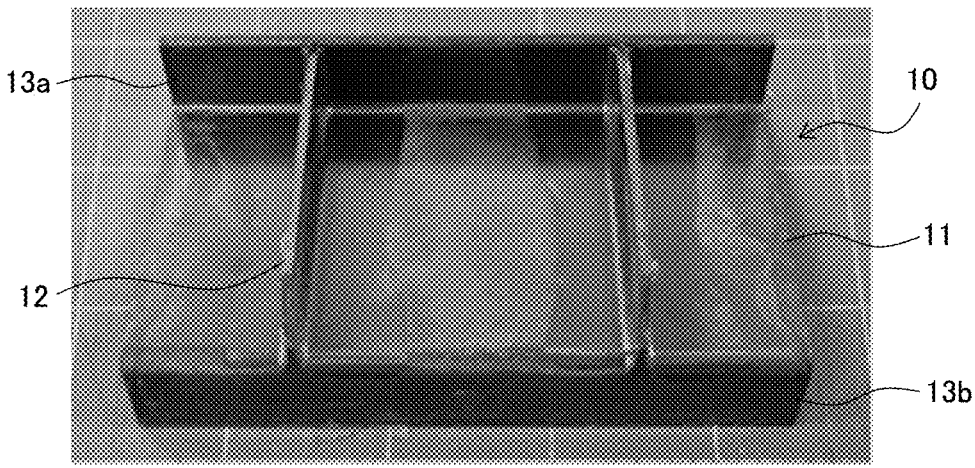
FIG. 8A is an appearance photograph showing a specific example of the panel structural body according to Example.
Figure 8B:
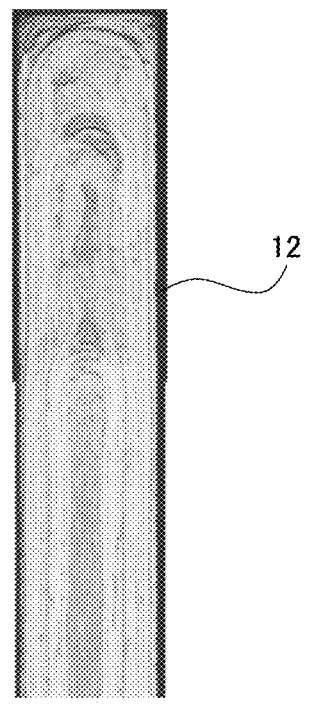
FIG. 8B is a photograph showing a section of the rib of the panel structural body shown in FIG. 8A.

Next, a specific Example of the panel structural body 10 will be described with reference to FIGS. 8A and 8B. FIG. 8A is a plane photograph showing Example of the panel structural body 10 and corresponds to a case where an image of the panel structural body 10 shown in FIG. 1 is taken from a left side in FIG. 1. FIG. 8B is a section photograph of the rib 12 included in the panel structural body 10 shown in FIG. 8A. The photographs of FIGS. 8A and 8B show a typical example of the above experimental verification by the present inventors.

The panel structural body 10 shown in FIGS. 8A and 8B is manufactured by laminating the doubler layers additionally to the basic layers and subjecting them to the press-forming. As is clear from FIG. 8B, it is observed that the reinforced fibers reach the tip portion of the rib 12. Therefore, according to the present disclosure, it is clear that the panel structural body 10 in which the reinforced fibers reach the tip portion of the rib 12 can be manufactured by the press-forming.

Modified Example

A specific shape of the panel structural body 10 according to the present disclosure is not limited to the structure shown in FIG. 1. The panel structural body 10 can be configured such that: the panel structural body 10 includes the substrate and the rib; the composite material layers are laminated in the substrate; and the rib has a plate shape standing with respect to the substrate. Therefore, the panel structural body 10 shown in FIG. 1 does not have to have a Z-shaped section, and at least one of both side edge portions does not have to be the flange portion. Moreover, the extending direction of the rib does not have to be a direction orthogonal to the side edge portion as shown in FIG. 1. However, as described above, the panel structural body 10 can be configured such that in addition to the composite material layers, the doubler layers are laminated in at least the rib base bottom portion 14 of the substrate. The composite material layer is a basic layer constituting the substrate. The doubler layer is an additional composite material layer. The reinforced fibers reach the tip portion of the rib 12.

In the panel structural body 10 according to the present disclosure, for example, in FIG. 1, the web portion 11 that is the substrate has a flat plate shape. However, the web portion 11 may have a curved structure depending on the use of the panel structural body 10. Typically, the rib 12 is arranged to reinforce the substrate. In FIG. 1, the web portion 11 is the substrate. Therefore, the thickness and height of the rib 12 can be set to a thickness and a height which correspond to the required strength and required rigidity of the substrate. Similarly, the thicknesses, widths, heights, and the like of the flange portions 13a and 13b and other structural parts included in the panel structural body 10 can be suitably set.

FIG. 2 schematically shows the filler layers 23 laminated in the filler region 15. A typical range of the volume of the total of the number of filler layers 23 laminated is not limited to the above range of not less than 1.0 time the filler reference volume and not more than 3.0 times the filler reference volume. Although it depends on conditions, as merely one example, a preferable range of the volume of the total of the number of filler layers 23 laminated is a range of not less than 1.2 times the filler reference volume and not more than 1.5 times the filler reference volume. When the number of filler layers 23 laminated falls within this range, the recess is not practically generated on the second surface 11b of the substrate, i.e., web portion 11. Moreover, when the number of filler layers 23 laminated falls within this range, uniform arrangement of the matrix resin 20 and the reinforced fibers can be easily realized at the rib base bottom portion 14.

Depending on the use of the panel structural body 10, each of the prepreg laminated bodies 30A and 30B may include a different material layer from the prepreg, i.e., the composite material layer. To be specific, the panel structural body 10 according to the present disclosure may include a different material from the composite material. As merely one example, a resin layer made of a resin or resin composition having stretchability may be laminated on the first surface 11a or the second surface 11b of the prepreg laminated body 30A or 30B. The panel structural body 10 including a surface on which the resin layer is formed can be manufactured by subjecting the prepreg laminated body 30A or 30B including the resin layer to the press-forming.

Examples of the resin layer on the surface include: a layer that imparts machinability; and a layer that improves the appearance of the panel structural body 10. However, the resin layer is not especially limited. The machinability denotes, for example, a characteristic that prevents burrs, splits, and the like from being generated at the time of the above formation of holes.

Each of the prepreg laminated bodies 30A and 30B may include a metal mesh layer or metal foil as the different material layer. Since each of the metal mesh layer and the metal foil has stretchability, each of the metal mesh layer and the metal foil can be suitably used as the different material layer of the panel structural body 10 according to the present disclosure. For example, a copper mesh layer may be laminated on the surface of each of the prepreg laminated bodies 30A and 30B. The panel structural body 10 including the surface on which the copper mesh is formed can be manufactured by subjecting each of the prepreg laminated bodies 30A and 30B including the copper mesh layer to the heat press forming.

Moreover, as the different material layer, each of the prepreg laminated bodies 30A and 30B may include a material layer made of a nonconductive composite material. One example of the nonconductive composite material is glass fiber reinforced plastic (GFRP). The nonconductive composite material may be laminated on the entire surface of each of the prepreg laminated bodies 30A and 30B or may be laminated on a part of the surface of each of the prepreg laminated bodies 30A and 30B. The panel structural body 10 including the surface on which the nonconductive composite material layer is formed can be manufactured by subjecting the laminated body including the nonconductive composite material layer to the heat press forming.

Typically, the nonconductive composite material on the surface can be used as a countermeasure against electrolytic corrosion. One example of the countermeasure against the electrolytic corrosion is a countermeasure to suppress corrosion of a metal member when CFRP contacts the metal member which is largely different in ionization tendency from the CFRP. A specific type of the nonconductive composite material is not especially limited, and a known material may be suitably used. Moreover, the use of the nonconductive composite material is not limited to the countermeasure against the electrolytic corrosion, and may be any known use.

As above, a panel structural body according to the present disclosure is a composite material panel structural body that is a press-formed article including a composite material containing reinforced fibers and a matrix resin. The composite material panel structural body includes: a substrate; and a rib standing with respect to the substrate. Basic layers that are composite material layers are laminated in the substrate, the number of basic layers laminated being determined based on a design thickness of the substrate, the design thickness being calculated from a volume of the substrate and a volume of the rib. Doubler layers that are the composite material layers are laminated in at least a rib base bottom portion of the substrate in addition to the basic layers, the rib standing at the rib base bottom portion. The reinforced fibers reach a tip portion of the rib.

According to the above configuration, in the composite material panel structural body including the rib that is the reinforcement structure for the substrate, the doubler layers that exceed the reference lamination number are laminated in the rib base bottom portion. With this, the panel structural body in which the reinforced fibers reach the tip portion of the rib only by the press-forming and which includes the reinforcement structure can be manufactured. Moreover, since the reinforced fibers reach the tip portion of the rib that is the reinforcement structure regardless of the thicknesses and heights of the substrate and the rib, the strength and rigidity of the substrate can be made satisfactory. As a result, the panel structural body having satisfactory strength and rigidity can be manufactured at low cost.

In the composite material panel structural body configured as above, a volume of a total of the number of basic layers laminated and the number of doubler layers laminated may be a value within a range of not less than the forming reference volume and not more than 1.25 times the forming reference volume, the forming reference volume being a designed volume of the composite material panel structural body.

Moreover, in the composite material panel structural body configured as above, when the composite material layers included in the rib and a part of the substrate which is curvedly connected to the rib are referred to as a first surface laminated body, the composite material layers that are located on a surface of the first surface laminated body which is located at an opposite side of the rib and are included in the substrate are referred to as a second surface laminated body, and a region which is between the first surface laminated body and the second surface laminated body, extends along the rib, and has a triangular section is referred to as a filler region, composite material filler layers may be located only in the filler region.

Moreover, in the composite material panel structural body configured as above, a volume of the laminated composite material filler layers laminated may be a value within a range of not less than the filler reference volume and not more than 3.0 times the filler reference volume which is a designed volume of the filler region.

Moreover, a method of manufacturing a panel structural body according to the present disclosure is a method of manufacturing a composite material panel structural body which includes a substrate and a rib standing with respect to the substrate and also includes a composite material containing reinforced fibers and a matrix resin. The method includes: forming a prepreg laminated body by laminating basic plies that are prepregs, the number of basic plies being a value by which the substrate has a design thickness and laminating doubler plies that are prepregs at a rib base bottom portion of the substrate, the rib standing at the rib base bottom portion; and subjecting the prepreg laminated body to press-forming with a forming die.

According to the above configuration, when manufacturing by the press-forming the composite material panel structural body including the rib that is the reinforcement structure for the substrate, the prepregs that exceed the reference lamination number are laminated in the rib base bottom portion. With this, in the panel structural body obtained by the press-forming, the reinforced fibers reach the tip portion of the rib that is the reinforcement structure regardless of the thicknesses and heights of the substrate and the rib. Moreover, since the reinforced fibers reach the tip portion of the rib that is the reinforcement structure, the strength and rigidity of the substrate can be made satisfactory. As a result, the panel structural body having satisfactory strength and rigidity can be manufactured at low cost.

In the method of manufacturing the composite material panel structural body configured as above, a total of the number of basic plies laminated and the number of doubler plies laminated may be a value within a range of not less than a volume of a cavity of the forming die and not more than 1.25 times the volume of the cavity.

Moreover, in the method of manufacturing the composite material panel structural body configured as above, in the composite material panel structural body, when composite material layers included in the rib and a part of the substrate which is curvedly connected to the rib are referred to as a first surface laminated body, composite material layers that are located on a surface of the first surface laminated body which is located at an opposite side of the rib and are included in the substrate are referred to as a second surface laminated body, and a region which is between the first surface laminated body and the second surface laminated body, extends along the rib, and has a triangular section is referred to as a filler region, filler plies that are prepregs may be laminated only in the filler region.

Moreover, in the method of manufacturing the composite material panel structural body configured as above, when a designed volume of the filler region is referred to as a filler reference volume, the number of filler plies laminated may be a value within a range of not less than the filler reference volume and not more than 3.0 times the filler reference volume.

A specific use of the panel structural body 10 according to the present disclosure is not especially limited. The panel structural body 10 according to the present disclosure can be suitably used as a panel-shaped member used in various fields, such as an aerospace field, an automobile/two-wheeled vehicle field, a railcar field, a marine field, an industrial equipment field, a medical equipment field, a sports goods field, and an architecture/civil engineering field. More preferably, the panel structural body 10 according to the present disclosure is used in an aerospace field of aircrafts, spacecrafts, and the like.

The present disclosure is not limited to the above-described embodiment and may be modified in various ways within the scope of the claims, and embodiments obtained by suitably combining technical means disclosed in different embodiments and/or plural modified examples are included in the technical scope of the present disclosure.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

What is claimed is:

1. A composite material panel structural body, comprising:

a substrate; and a rib standing with respect to the substrate at a rib base bottom portion of the substrate, wherein:

the substrate includes a laminated structure including basic layers that are composite material layers and which extend along a length of the substrate and into the rib, the composite material layers include reinforced fibers and a matrix resin, a number of the basic layers corresponds to a thickness of the substrate and the thickness corresponds to a combination of a volume of the substrate and a volume of the rib, and the substrate further includes doubler layers that are laminations of the composite material layers, wherein the doubler layers are laminated in addition to the basic layers, the doubler layers are included in at least the rib base bottom portion, and the doubler layers extend from the rib base bottom portion to a tip portion of the rib so that the reinforced fibers of the doubler layers reach the tip portion of the rib.

2. The composite material panel structural body according to claim 1, wherein:

a volume of a total of the number of basic layers laminated and a number of doubler layers laminated is a value within a range of not less than a forming reference volume and not more than 1.25 times the forming reference volume, the forming reference volume being a designed volume of the composite material panel structural body.

3. The composite material panel structural body according to claim 1, wherein:

composite material filler layers are located only in a filler region, the filler region being a region which is between a first surface laminated body and a second surface laminated body, the filler region extending along the rib and having a triangular section, the first surface laminated body includes the composite material layers included in the rib and a part of the substrate which is curvedly connected to the rib, and the second surface laminated body includes the composite material layers that are located on a surface of the first surface laminated body which is located at an opposite side of the rib and are included in the substrate.

4. The composite material panel structural body according to claim 3, wherein:

a volume of the laminated composite material filler layers is within a range of not less than a filler reference volume and not more than 3.0 times the filler reference volume which is a designed volume of the filler region.

5. The composite material panel structural body according to claim 1, wherein:

the reinforced fibers are at least one of continuous fibers or slit continuous fibers.

6. The composite material panel structural body according to claim 1, wherein:

the composite material panel structural body is for use in an aircraft, a spacecraft, or an automobile.

7. The composite material panel structural body according to claim 1, wherein:

the reinforced fibers are carbon fibers; and the matrix resin is a thermosetting resin or a thermoplastic resin.

8. The composite material panel structural body according to claim 1, wherein:

a volume of a total of the number of basic layers laminated and a number of doubler layers laminated is a value within a range of not less than a forming reference volume.

9. A method of manufacturing a composite material panel structural body, the method comprising:

forming a prepreg laminated body which includes reinforced fibers and a matrix resin by:

laminating basic plies that are prepregs, and laminating doubler plies that are prepregs at a rib base bottom portion of a substrate so that there is a rib standing at the rib base bottom portion; and press-forming the prepreg laminated body with a forming die, wherein:

after the press-forming, the substrate includes:

a laminated structure including basic layers that are composite material layers and which extend along a length of the substrate and into the rib, the composite material layers including reinforced fibers and a matrix resin, and a number of the basic layers corresponding to a thickness of the substrate and the thickness corresponding to a combination of a volume of the substrate and a volume of the rib, and doubler layers that are laminations of the composite material layers, wherein the doubler layers are laminated in addition to the basic layers, the doubler layers are included in at least the rib base bottom portion, and the doubler layers extend from the rib base bottom portion to a tip portion of the rib so that the reinforced fibers of the doubler layers reach the tip portion of the rib.

10. The method according to claim 9, wherein:

a volume of a total of a number of basic plies laminated and a number of doubler plies laminated is a value within a range of not less than a volume of a cavity of the forming die and not more than 1.25 times the volume of the cavity.

11. The method according to claim 9, wherein:

composite material filler layers are located only in a filler region, the filler region being a region which is between a first surface laminated body and a second surface laminated body, the filler region extending along the rib and having a triangular section, the first surface laminated body includes the composite material layers included in the rib and a part of the substrate which is curvedly connected to the rib, and the second surface laminated body includes the composite material layers that are located on a surface of the first surface laminated body which is located at an opposite side of the rib and are included in the substrate.

12. The method according to claim 11, wherein:

a volume of the laminated composite material filler layers is within a range of not less than a filler reference volume and not more than 3.0 times the filler reference volume which is a designed volume of the filler region.

13. A composite material panel structural body, comprising:

a substrate; and a rib standing with respect to the substrate at a rib base bottom portion of the substrate, wherein:

the substrate includes a laminated structure including basic layers that are composite material layers and which extend along a length of the substrate and into the rib, the composite material layers include reinforced fibers and a matrix resin, a number of the basic layers corresponds to a thickness of the substrate, the thickness being calculated based on a volume of the substrate and a volume of the rib, the substrate further includes doubler layers that are laminations of the composite material layers, wherein the doubler layers are laminated in addition to the basic layers, the doubler layers are included in at least the rib base bottom portion, and the doubler layers extend from the rib base bottom portion to a tip portion of the rib so that the reinforced fibers of the doubler layers reach the tip portion of the rib, a first volume is a volume of a total of the number of basic layers and a number of the doubler layers, a second volume is a volume of the composite material panel structural body, and the first volume is within a range of not less than the second volume and not more than 1.25 times the second volume.

* * * * *